US009622612B2

(12) United States Patent
Righetti

(10) Patent No.: US 9,622,612 B2
(45) Date of Patent: Apr. 18, 2017

(54) DEVICE FOR ORIENTING CAPSULES IN A BEVERAGE PRODUCING MACHINE

(75) Inventor: Marco Righetti, Camugnano (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 269 days.

(21) Appl. No.: 14/235,630

(22) PCT Filed: Aug. 3, 2012

(86) PCT No.: PCT/IB2012/053979
§ 371 (c)(1),
(2), (4) Date: Jan. 28, 2014

(87) PCT Pub. No.: WO2013/018066
PCT Pub. Date: Feb. 7, 2013

(65) Prior Publication Data
US 2014/0166686 A1   Jun. 19, 2014

Related U.S. Application Data

(60) Provisional application No. 61/515,088, filed on Aug. 4, 2011.

(51) Int. Cl.
*A47J 31/36* (2006.01)
(52) U.S. Cl.
CPC ....... *A47J 31/3623* (2013.01); *A47J 31/3642* (2013.01)

(58) Field of Classification Search
None
See application file for complete search history.

(56) References Cited

U.S. PATENT DOCUMENTS

| 5,318,200 A | * | 6/1994 | Allen | ............ A61F 11/08 221/192 |
| 6,240,832 B1 | | 6/2001 | Schmed et al. | |
| 2009/0250482 A1 | | 10/2009 | Blanchino et al. | |

FOREIGN PATENT DOCUMENTS

| EP | 1571951 B1 | 6/2006 |
| EP | 1797800 A2 | 6/2007 |

* cited by examiner

*Primary Examiner* — Gene Crawford
*Assistant Examiner* — Ayodeji Ojofeitimi

(57) ABSTRACT

A device for orienting and feeding capsules in a beverage producing machine includes a container that receives randomly oriented capsules, and a rotor that is rotatable around a rotation axis and is at least partly arranged in the container. The rotor is provided with at least one peripherally arranged capsule-receiving seat that is shaped to pick up a capsule oriented in a univocally determined orientation. Further, a capsule unloading duct with a duct inlet is arranged in the container and extends outside the container. The rotor is arranged to rotate around the rotation axis such to, during use, lift a capsule towards a position above the duct inlet, and the capsule-receiving seat is arranged to release the capsule under an influence of gravity from the position above the duct inlet into the duct inlet.

15 Claims, 4 Drawing Sheets

DEVICE FOR ORIENTING CAPSULES IN A BEVERAGE PRODUCING MACHINE

CROSS-REFERENCE TO PRIOR APPLICATIONS

This application is the U.S. National Phase application under 35 U.S.C. §371 of International Application No. PCT/IB2012/053979, filed on Aug. 3, 2012, which claims the benefit of U.S. Provisional Patent Application No. 61/515,088 filed Aug. 4, 2011. These applications are hereby incorporated by reference herein.

TECHNICAL FIELD

The present invention concerns the field of beverage preparing machines and in particular, though not exclusively, the field of vending machines for producing beverages from single-serving capsules, pods or cartridges. More specifically, the present invention concerns improvements in devices for feeding capsules of pre-packaged beverage ingredients to a beverage preparing unit of a beverage producing machine.

BACKGROUND ART

Beverage producing machines, in particular but not exclusively coffee preparing machines are known which use capsules, pods or cartridges containing a predetermined amount of ingredients for the preparation of the beverage. In particular, coffee preparing machines are known, which use capsules or cartridges made of aluminium foil, plastic or the like, containing coffee powder from which a coffee beverage is extracted by means of pressurised hot water. The capsules are introduced individually in a brewing unit. The brewing unit usually comprises a brewing chamber in which the capsule is introduced. The brewing chamber is closed and hot pressurised water flows through the capsule to extract the flavours from the ingredients contained therein.

Usually the capsules are not symmetrical with respect to a plane orthogonal to the axis of the brewing chamber. They often have a front face and a back face differing from one another. The capsules must be introduced in the brewing unit in a correctly oriented position.

In household machines the capsules are often introduced one at a time by the user when a brewing cycle has to be performed. In some machines, and in particular in vending machines, a capsule storage or container is provided, in which a certain amount of capsules is stored, allowing then several brewing cycles to be performed without the need for introducing a new capsule each time.

U.S. Pat. No. 6,240,832 discloses a capsule feeding device for a brewing unit. The capsule feeding device comprises a capsule magazine in the form of a vertically extending tubular housing. A certain amount of pre-oriented capsules are arranged in the magazine such that they can be individually fed into the brewing unit when required.

Filling up the capsule magazine requires time, because the capsules must be introduced in a pre-determined oriented position. In vending machines a large amount of capsules must be charged in the magazine. This operation is time-consuming and therefore costly.

EP-A-1571951 discloses a capsule orienting and feeding apparatus which receives randomly oriented capsules from a magazine and properly orients the capsules individually such that the capsules can be fed in the properly oriented position towards a brewing unit arranged underneath the capsule orienting apparatus. This apparatus is particularly complex and expensive. The large number of mechanical components makes the device prone to failure.

US-A-2009/0250482 discloses a different automatic dispensing device for orienting capsules to be fed to a brewing unit. In this known device a container is provided, into which the capsules are randomly placed. The container rotates around an inclined axis and is provided with peripherally arranged slots. The slots are shaped such that capsules can fall through the slots only when they are properly oriented. The capsules exit the rotating container through the slots in the properly oriented position and fall into a channel from which they are fed to a brewing unit.

This known device, though simple, is not entirely reliable.

BRIEF DESCRIPTION OF THE INVENTION

The invention provides a novel device for orienting capsules in a beverage producing machine which is particularly efficient, inexpensive and reliable.

According to some embodiments, a device for orienting and feeding capsules in a beverage producing machine, is provided, comprising: a container receiving randomly oriented capsules; a rotor, rotatable around a rotation axis, and at least partly arranged in said container; and a capsule unloading duct, with a duct inlet arranged in the container and extending outside said container. The rotor is advantageously provided with at least one peripherally arranged capsule-receiving seat, shaped to pick up a capsule. The seat is shaped such that the capsule enters the seat only if oriented in a univocally determined orientation with respect to the seat. Moreover, the rotor is arranged to rotate around the rotation axis such as to lift a capsule towards a position above the duct inlet. The capsule-receiving seat on said rotor is in turn arranged to release the capsule under the influence of gravity from said above position into the duct inlet.

Once released from the seat of the rotor the capsule can be conveyed, e.g. by sliding under the effect of gravity, along the unloading duct towards a beverage-preparation unit. The orientation of the capsule unloaded from the seat is substantially the correct position for entering the beverage-preparation unit. Thus, the orienting and feeding device according to the invention is able to orient a capsule with a single rotating member (the rotor) and to discharge the capsule in the unloading duct once already properly oriented for entering the beverage-preparation unit or a storage area from where the capsule is subsequently fed to the beverage-preparation unit, without requiring further manipulation for orienting purposes. The resulting device is simple and reliable, comprises a reduced number of components and handles the capsule gently.

According to some embodiments the rotor comprises a plurality of peripherally arranged capsule-receiving seats. This increases the output rate of the device without having to increase the rotation speed of the rotor.

In some embodiments the container is cylindrical, and the rotor co-axial to the container.

According to some embodiments, each capsule-receiving seat is shaped such that a capsule retained therein is oriented with an axis of the capsule substantially orthogonal to the rotation axis of the rotor and with a larger front face oriented radially inwardly facing said rotation axis and a smaller back face oriented radially outwardly, i.e. facing away from said rotation axis.

The capsules can be advanced along the unloading duct. However, in preferred embodiments the capsule advance along the unloading duct under the effect of gravity, e.g. by sliding therealong. In some embodiments, to assist advancement of the capsules by gravity along the unloading duct, in the operative position the rotor is arranged with the rotation axis thereof inclined over the horizontal, e.g. by an angle between 10° and 80°. The unloading duct can be provided with at least a first inlet portion, which is substantially parallel to the rotation axis of the rotor, the inclination assisting the advancing movement of the capsule by gravity along the unloading duct.

The unloading channel can be shaped and arranged such as to unload the capsules directly into a beverage-preparation unit, such as a brewing unit with a brewing chamber. In preferred embodiments, however, the capsule unloading duct is connected to a collecting channel or a storage area, in which capsules unloaded in said unloading duct are collected in an oriented position forming a stack of correctly oriented capsules, ready to be delivered towards the beverage-preparation unit upon demand, i.e. when a beverage is requested.

The collecting channel forms a capsule storage, such that several capsules can be arranged in the properly oriented position and subsequently fed one after the other into the beverage-preparation unit upon demand. The movement of the rotor becomes thus at least partly independent from the operation of the beverage-preparation unit.

According to a further aspect, the invention concerns a beverage producing machine comprising a beverage-preparation unit and a capsule orienting and feeding device as set forth above.

According to yet another aspect, the invention concerns a method for orienting and feeding capsules in a beverage-preparation machine, including: providing a container with a rotor arranged at least partly in said container, said rotor being rotatable around a rotation axis and being provided with at least one capsule-receiving seat. The method further includes randomly feeding capsules in said container and individually entering capsules in said at least one capsule-receiving seat of said rotor. By rotating said rotor each capsule received in the capsule-receiving seat is moved in a releasing position and released in an oriented position into an unloading duct.

Preferably, the rotation axis of the rotor is inclined over the horizontal, such as to pick up each capsule from a lower position and lifting the capsule towards an upper position. The capsule is then released under the influence of gravity from said upper position, falling out of the capsule-receiving seat into the unloading duct.

According to some embodiments, the method further includes the step of feeding the oriented capsules from the unloading duct into a beverage-preparation unit, either directly or through a capsule storage area, without requiring further orientation. This means that orientation of the capsule exiting the capsule-receiving seat of the rotor substantially corresponds to the orientation of the capsule in the beverage-preparation unit. "Substantially corresponding" means that the capsule can enter the beverage-preparation unit without requiring additional kipping or rotating action, but at least a slight tilting movement to adjust the orientation of the capsule axis by a limited angle, e.g. about 0-30°.

Capsules are usually provided with a front face, a back face and a side wall extending between the front face and the back face. The capsules usually have an axis of symmetry. The front and back faces are broadly orthogonal to said axis. Usually the front and back faces are broadly circular and the side wall is broadly cylindrical or conical, even though prismatic or pyramidal capsules can also be envisaged. In some embodiments the capsule exits the capsule-receiving seat with the axis broadly oriented according to the final orientation which the capsule axis takes when entering the beverage-preparation unit. In some embodiments the rotor and the capsule unloading duct are arranged such that the capsule axis is broadly vertical or approximately vertical. Minor adjustments of the capsule axis along the trajectory from the upper position, where they are released by gravity from the rotor, to the beverage-preparation unit are possible by simple interaction e.g. with the walls of the unloading duct and/or of a storage area, such as a collecting channel.

The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
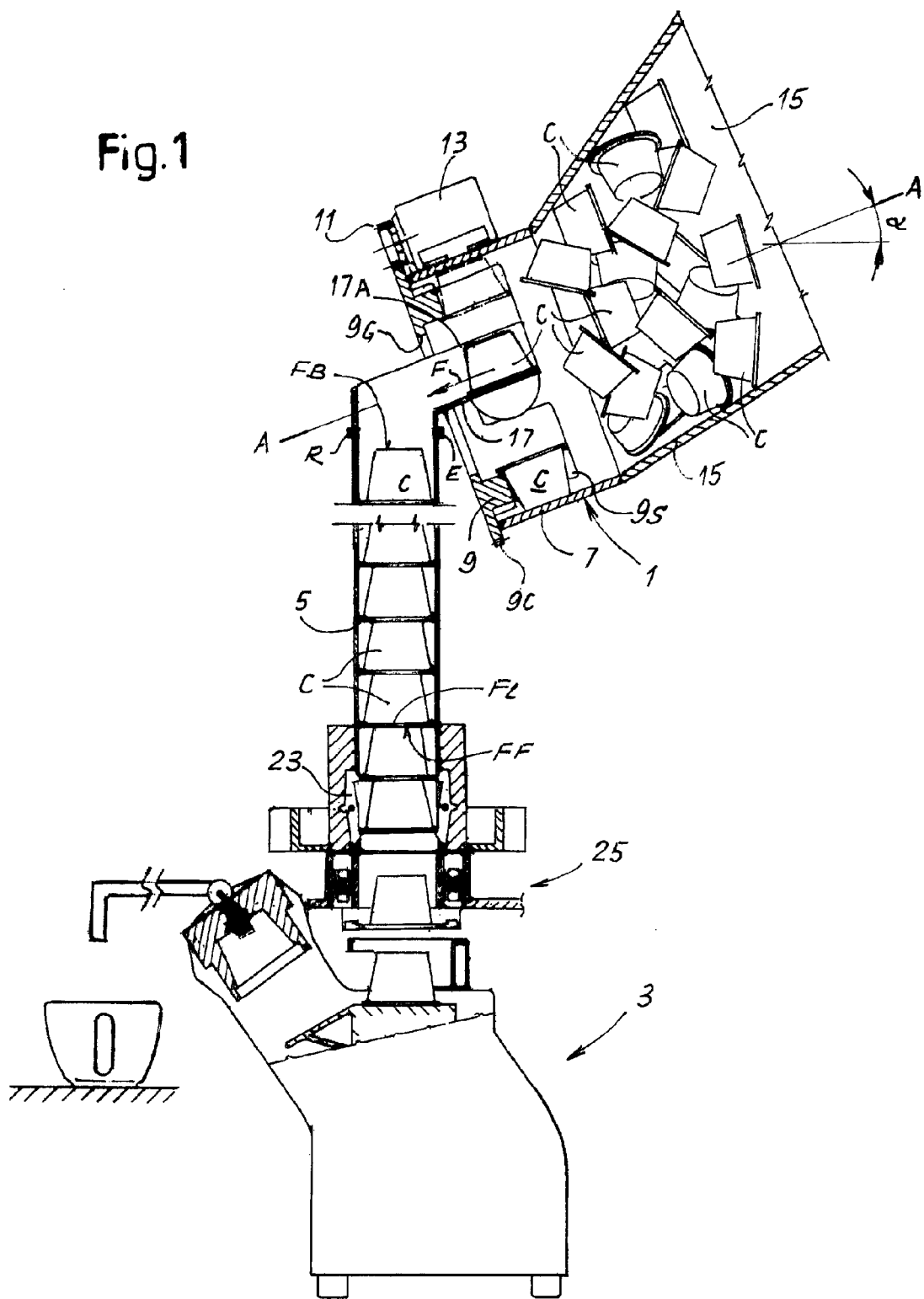
FIG. 1 illustrates a side and partial cross-sectional view of the capsule orienting and feeding device in combination with a brewing unit.

FIG. 1 illustrates a capsule orienting and feeding device in combination with a beverage-preparation unit, such as e.g. a brewing unit. The capsule orienting and feeding device and the brewing unit can be arranged inside a vending machine, for example, or a different beverage preparing machine. In the following description reference will specifically be made to capsules for the production of coffee-based beverages, but it should be understood that the invention can be used also to handle capsules containing different kinds of ingredients, for the production of different beverages, either cold or hot. The ingredients can be suitable for extraction with hot water, either pressurised or not, such as in particular coffee powder, or ingredients which are soluble in hot or cold water, or concentrated ingredients which must be diluted with hot or cold water, or any other kind of product which should be packaged in individual capsules and individually introduced in a beverage-preparation unit.

The capsules can be single-dose or multi-dose capsules and can be made of any suitable material, such as plastic, aluminium foil or the like. The capsules can be sealed and handled in a brewing unit which is provided with perforating or aperturing devices. In other embodiments the capsules can be sealed on one side and water-pervious on the other and require only one perforating or aperturing device. In yet further embodiments the capsules can be water-pervious on both sides, such that no aperturing, puncturing or perforating devices are required in the beverage producing unit.

The capsules orienting and feeding device is designated 1 as a whole and is arranged above a brewing unit 3. The brewing unit 3 represented in FIG. 1 is similar to the brewing unit disclosed in U.S. Pat. No. 6,240,832. It should however be understood that the brewing unit can be different from the one shown in the drawings. A different beverage preparation unit can also be envisaged.

Between the capsule orienting and feeding device 1 and the brewing unit 3 a collecting channel 5 is arranged, in which the capsules C are fed by the capsule orienting and feeding device 1. The capsules collected in the collecting channel 5 are all oriented in the same way. In the embodiment shown in the drawings the capsules C are frustum shaped, with a front face FF and a back face FB. A flange FL extends circumferentially from the front face FF. The side surface of the capsules between the front face FF and the back face FB has the shape of a truncated cone. The shape of the capsule can be different from the one specifically shown in the drawings for illustrative purposes only. What is important is only that the capsule must be oriented, i.e. it has a front face and a back face which differ from one another.

The capsule orienting and feeding device 1 comprises a container 7. The container 7 can be cylindrical with a circular cross section as shown in the drawings, even though different shapes can be suitable as well. A-A indicates an axis of symmetry of the container 7. The axis A-A is inclined by an angle α over the horizontal.

The device 1 further comprises a rotor 9, which rotates around the axis A-A and is at least partly arranged inside the container 7.

The angle α of the axis A-A, representing the rotation axis of the rotor 9, can be adjusted if required. In the drawings the container 7 is provided with an extension 7A connected to a bracket 11, which can be fixed to the frame of the machine (not shown) wherein the capsule orienting and feeding device 1 and the brewing unit 3 are arranged. The components 7A and 11 can be mutually connected by means of a screw 13, which allows the inclination of the container 7 and therefore of the rotation axis A-A of the rotor 9 to b adjusted according to needs.

In some embodiments the rotor 9 can be rotatably supported on supports provided inside or outside the container 7 and not shown.

The rotor 9 is provided with suitable means which put the rotor into rotation around the axis A-A. By way of example in the embodiment disclosed in the drawings the rotor is provided with a toothed crown 9C developing around the rotor 9 and arranged outside the container 7. The toothing of the crown 9C meshes with a gear 11 of an electric motor 13. In some embodiments the electric motor 13 is supported on the outer surface of the container 7, even though different arrangements are possible.

The rotor 9 comprises at least one capsule receiving seat 9S on the periphery thereof. Preferably a plurality of such seats 9S are provided. In the embodiment disclosed in the drawings four such seats 9S are provided and uniformly spaced around the circumferential development of the rotor 9.

The shape and/or dimension of the seats 9S are such that the capsules C can enter the seats 9S only in a predetermined orientation. In the embodiment shown, the shape of the capsules C and of the seats 9S is such that one capsule C can enter a respective seat 9S only with the larger front face FF oriented radially inwardly, i.e. oriented towards the rotation axis A-A of the rotor 9 and the back face FB oriented radially outwardly towards the side wall of the container 7.

Figure 3:
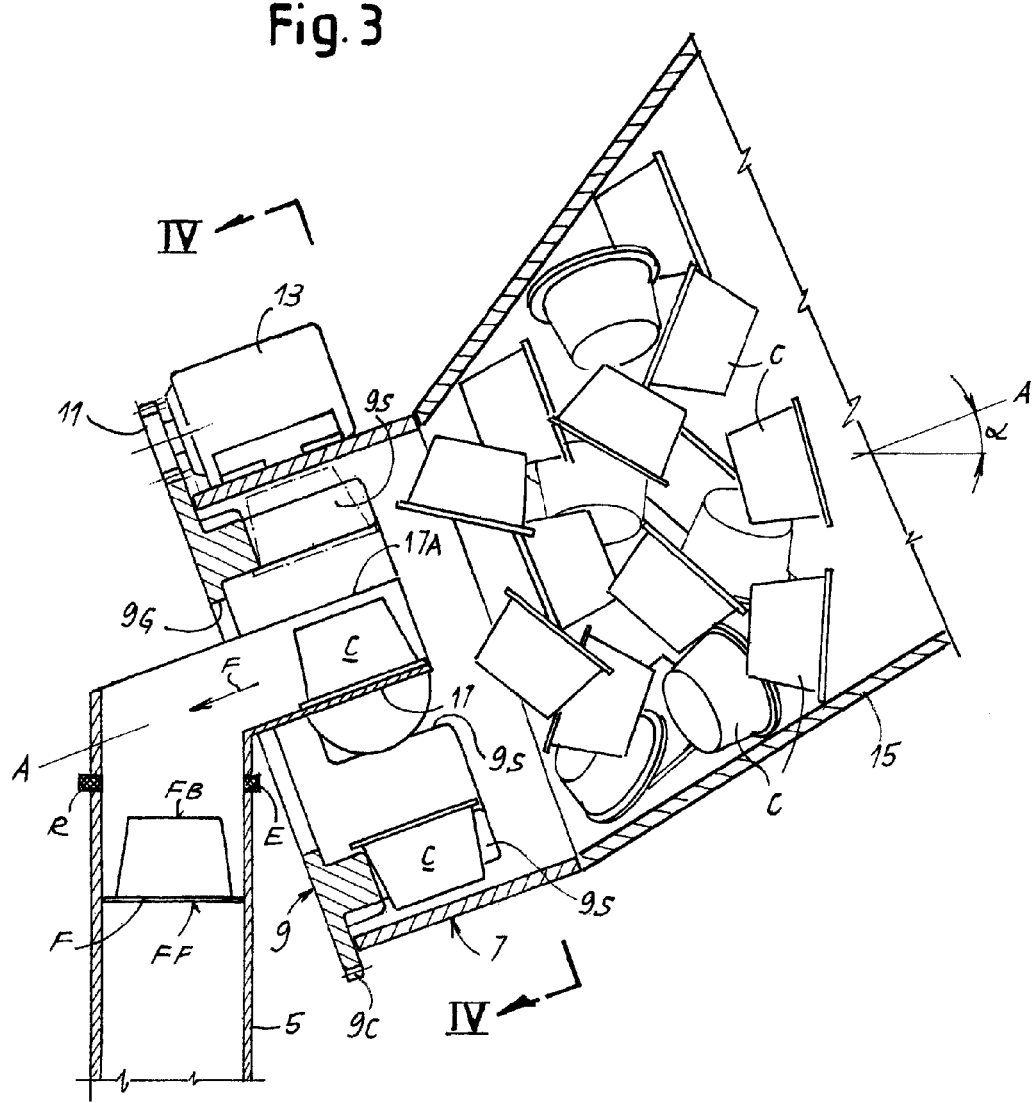
FIG. 3 illustrates an enlargement of the capsule orienting and feeding device of FIG. 1.

In some embodiments, a storage hopper 15 is arranged in front of the container 7. The storage hopper 15 contains a large amount of randomly distributed capsules C (see in particular FIG. 1 and FIG. 3). In some embodiments the container 7 and the hopper 15 can be designed as a single container, or the container 7 can be sufficiently large to accommodate the entire required number of capsules.

In some embodiments a capsule feeder can be arranged upstream of the container 7 to feed the capsules in the container. In preferred embodiments, as disclosed in the drawings, the capsules enter the container 7 by gravity. When the rotor 9 rotates around the axis A-A, said capsules C which enter the container randomly are individually picked up by the peripherally arranged capsule receiving seats 9S provided on the rotor 9. The direction of rotation of the rotor 9 is shown by arrow f9 (see in particular FIGS. 2, 4 and 5). In this way, individual capsules C entering the container 7 in a random orientation are received in the lowermost seat 9S and lifted by the rotor 9 rotating around rotation axis A-A, until they reach the uppermost position inside the container 7.

The rotor 9 is centrally hollow and a capsule unloading duct 17 is provided, extending inside the container 7 through the rotor 9. In some embodiments the unloading duct 17 is designed as an extension of the collecting channel 5.

Figure 2:
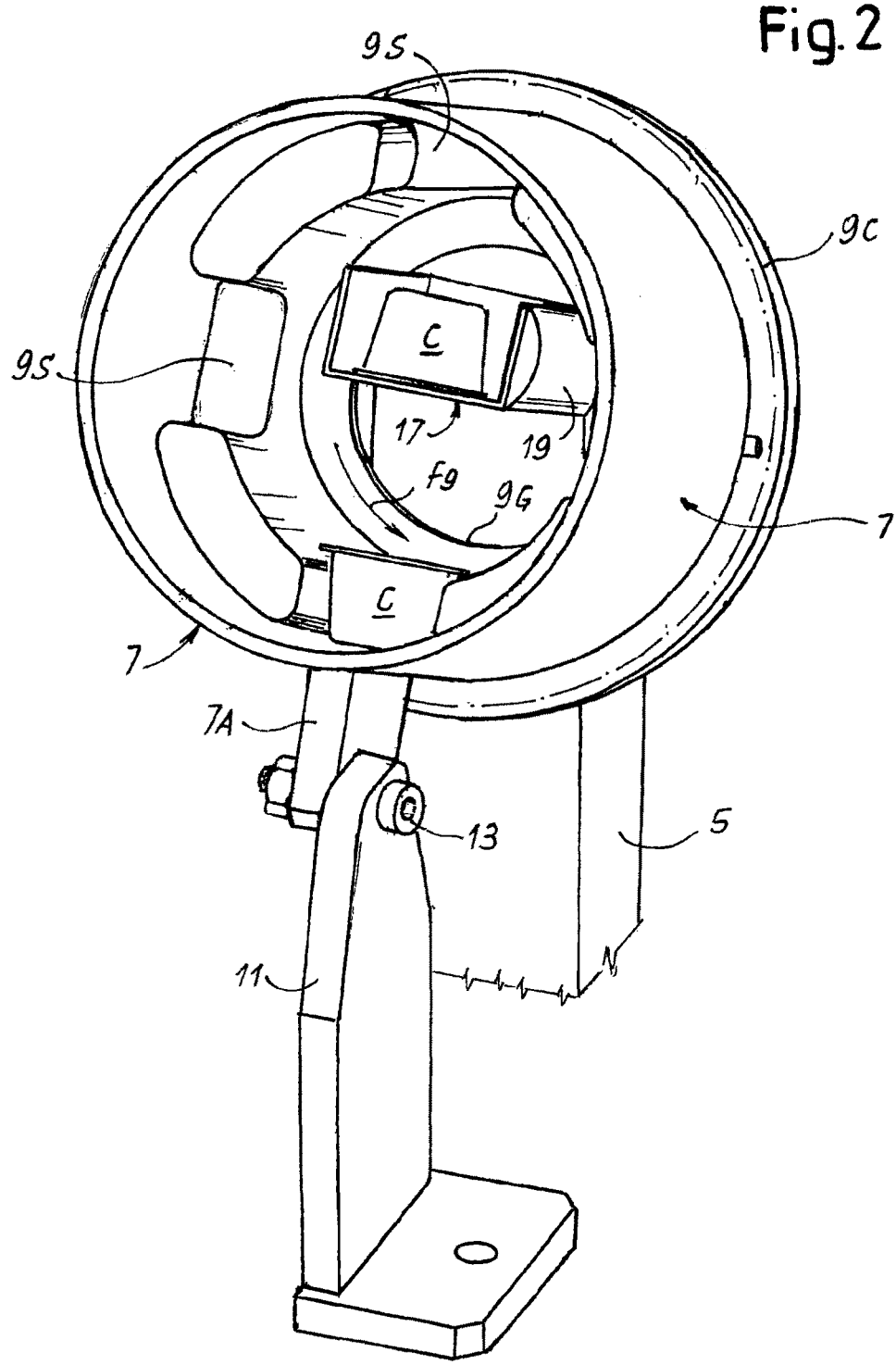
FIG. 2 illustrates a prospective view of the capsule orienting and feeding device.
Figure 4:
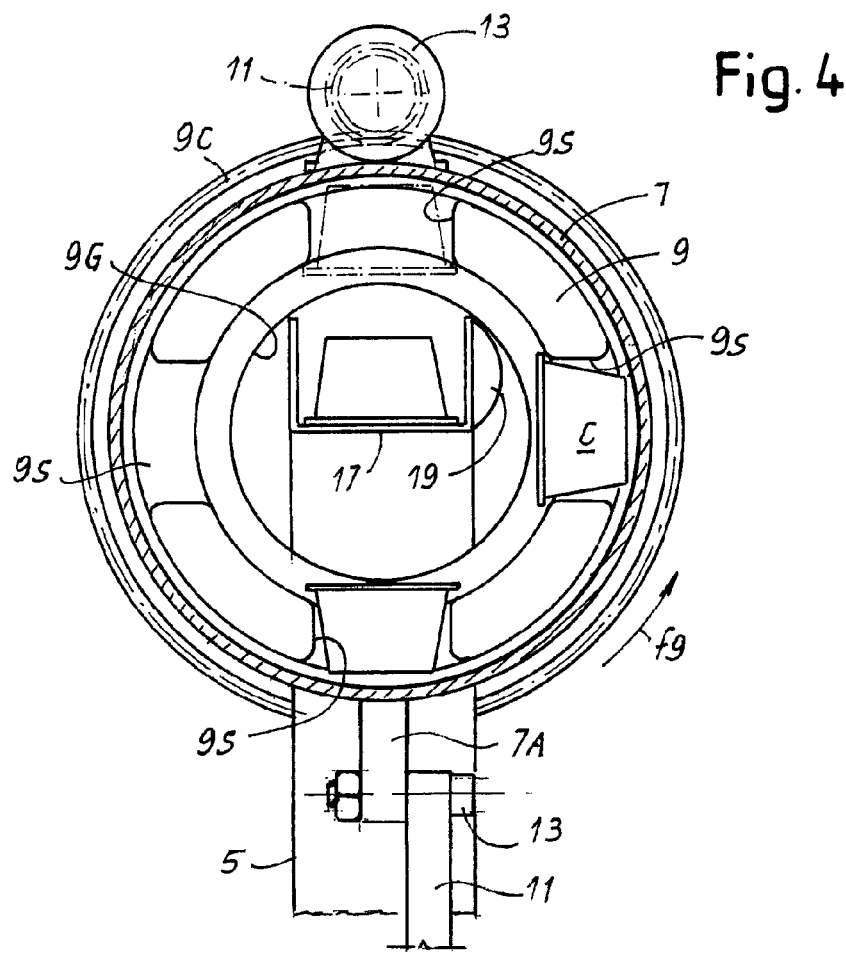
FIG. 4 shows a view according to line IV-IV of FIG. 3.
Figure 5:
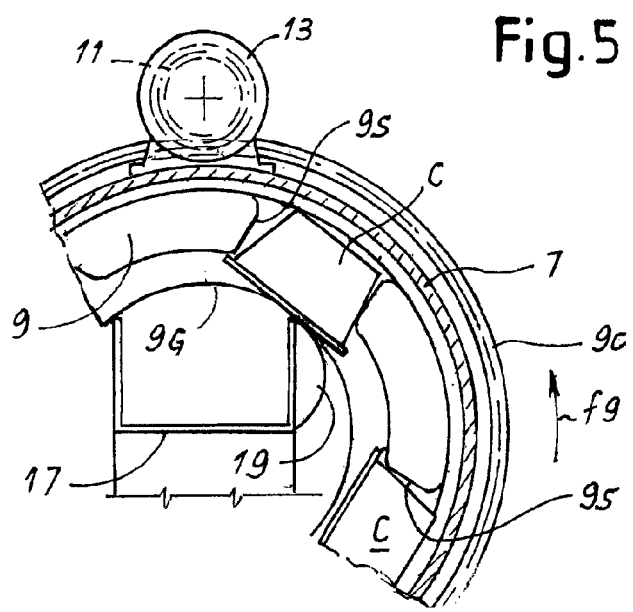
FIG. 5 illustrates a detail of the device of FIG. 4 in a different position.

In some embodiments the unloading duct 17 has a rectangular cross section (see in particular FIGS. 2, 4 and 5). The capsule unloading duct 17 is at least partly open on the top thereof, to form a duct inlet 17A, to receive the capsules C which are released from the uppermost seat 9S by gravity. The duct inlet 17A is arranged under the uppermost portion of the rotor 9. The unloading duct 17 is inclined over the horizontal and extends from the duct inlet 17A to the outside of the container 7. The inclination of the unloading duct 17 is such that the capsules C released by the rotor fall in the duct 17 through the duct inlet 17A and slide according to arrow F along the unloading duct until they reach an aperture from which the capsules fall by gravity inside the vertically extending collecting channel 5. For this purpose the unloading duct 17 extends inside the container 7 and through the rotor 9 to a sufficiently large extent in order to receive the capsules C which fall down by gravity each time the respective seat 9S in which a capsule C is housed reaches the uppermost position along the circular trajectory inside the container 7.

The unloading duct 17 can be suitably shaped (see FIGS. 4 and 5) in order to prevent the capsules C from exiting the seats 9S before reaching the uppermost position along the circular trajectory imposed by the rotation of rotor 9. For this purpose on one side of the unloading duct 17 a resting surface 19 can be provided, on which the capsules C rest without exiting the respecting seats 9S during the upward rotation of rotor 9.

The operation of the device described so far is apparent from the above description. The capsules C enter the container 7 in an entirely random orientation. The capsules enter the seats 9S always with the same orientation. The rotor 9 rotates (arrow f9) and lifts individual capsules engaged in the seats 9S until they reach the uppermost position from which the capsules fall, with the front face FF oriented downwardly, in the unloading duct 17. From there the capsules C slide until they reach the collecting channel 5, piling up on the bottom thereof, where suitable retention members 23 are provided. The rotor 9 can be kept into rotation until the entire collecting channel 5 is filled with correctly oriented capsules C.

Filling of the collecting channel 5 can be detected for example by means of a an optical sensor, comprising a light emitter E and a light receiver R. Different sensor arrangements can be provided to detect the level of the capsules inside the collecting channel, for example a capacitor sensor, a micro-switch, or any other suitable arrangement. In other embodiments a counter could be provided.

Once the collecting channel 5 has been filled up with capsules, the rotor 9 can be stopped. Each time a brewing cycle is performed, an individual capsule C is discharged from the bottom of the collecting channel 5 into the brewing unit 3. For this purpose dispensing members 25 are provided. These dispensing members are known per se and can be designed in any suitable way, for example as disclosed in U.S. Pat. No. 6,240,832.

The device 1 can be controlled such that the rotor 9 is put into rotation each time a brewing unit is performed, in order to refill the collecting channel 5 again.

Differently from other prior art devices, the capsule orienting and feeding device according to the invention contains a limited number of components and imparts to the capsules simple movements to achieve the final correct orientation. This results in a simple and reliable device.

The invention claimed is:

1. A device for orienting and feeding capsules in a beverage producing machine, comprising:
    a container receiving randomly oriented capsules;
    a rotor, rotatable around a rotation axis and at least partly arranged in said container, said rotor being provided with a peripherally arranged capsule-receiving seat, the peripherally arranged capsule-receiving seat being shaped to pick up a capsule oriented in a univocally determined orientation; and
    a capsule unloading duct, with a duct inlet arranged in said container and extending outside said container,
    wherein said rotor is configured to rotate by a rotation around said rotation axis, said rotation being configured to lift the capsule from a position below the duct inlet towards a position above the duct inlet, the peripherally arranged capsule-receiving seat being configured to release the capsule under an influence of gravity from said position above the duct inlet into said duct inlet.

2. The device according to claim 1, wherein said rotor comprises a plurality of peripherally arranged capsule-receiving seats.

3. The device according to claim 1, wherein said container is cylindrical, the rotor being co-axial to said container.

4. The device according to claim 1, wherein the peripherally arranged capsule-receiving seat is shaped for a capsule retained therein to be oriented with an axis of the capsule substantially orthogonal to the rotation axis of the rotor, and for the capsule retained therein to be oriented with a larger front face oriented radially inwardly, facing said rotation axis, and a smaller back face oriented radially outwardly.

5. The device according to claim 1, wherein in an operative position of said rotor, the rotation axis is inclined over a horizontal plane.

6. The device according to claim 5, wherein the rotation axis of said rotor forms an angle between 10° and 80° with respect to the horizontal plane.

7. The device according to claim 1, wherein the capsule unloading duct is connected to a collecting channel, in which capsules unloaded in said capsule unloading duct are collected in an oriented position.

8. The device according to claim 1, wherein the duct inlet is centrally arranged in said container and provided through said rotor, said rotor being centrally hollow, and wherein the rotor, provided with the peripherally arranged capsule-receiving seat, is further configured to rotate around the duct inlet.

9. A beverage producing machine comprising a beverage-preparation unit and a device, the device comprising:
    a container receiving randomly oriented capsules;
    a rotor, rotatable around a rotation axis and at least partly arranged in said container, said rotor being provided with a peripherally arranged capsule-receiving seat, the peripherally arranged capsule-receiving seat being shaped to pick up a capsule oriented in univocally determined orientation; and
    a capsule unloading duct, with a duct inlet arranged in said container and extending outside said container,
    wherein said rotor is configured to rotate by a rotation around said rotation axis, said rotation being configured to lift the capsule from a position below the duct inlet towards a position above the duct inlet, the peripherally arranged capsule-receiving seat being configured to release the capsule under an influence of gravity from said position above the duct inlet into said duct inlet, and
    wherein said capsule unloading duct is configured to deliver oriented capsules to said beverage-preparing unit.

10. The beverage producing machine according to claim 9, further comprising a capsule storage, wherein said capsules are randomly arranged, said capsule storage being connected to said device to dispense capsules in said container.

11. The beverage producing machine according to claim 9, wherein the duct inlet is centrally arranged in said container and provided through said rotor, said rotor being centrally hollow, and wherein the rotor, provided with the peripherally arranged capsule-receiving seat, is further configured to rotate around the duct inlet.

12. A method for orienting and feeding capsules in a beverage-preparation machine, the method comprising acts of:
- providing a container with a rotor arranged at least partly in said container, said rotor being rotatable around a rotation axis and being provided with a capsule-receiving seat;
- randomly feeding the capsules in said container;
- individually entering the capsules in said capsule-receiving seat; and
- rotating said rotor and releasing said capsules in an oriented position in an unloading duct,
- wherein said rotating act is configured to lift the capsules in said capsule-receiving seat from a position below the unloading duct towards a position above the unloading duct.

13. The method according to claim 12, wherein said rotating act rotates said rotor around an axis inclined over a horizontal plane to pick up said capsules from a lower position and to lift said capsules towards an upper position above the lower position, and wherein the capsules in the oriented position are released under an influence of gravity from said upper position into said unloading duct.

14. The method according to claim 12, further comprising an act of feeding the capsules in the oriented position from said unloading duct into a beverage-preparation unit.

15. The method according to claim 12, wherein said rotating acts rotates the capsules in said capsule-receiving seat around the unloading duct, the unloading duct being centrally arranged inside the container and provided through the rotor, the rotor being centrally hollow.

\* \* \* \* \*